Patented Sept. 11, 1934

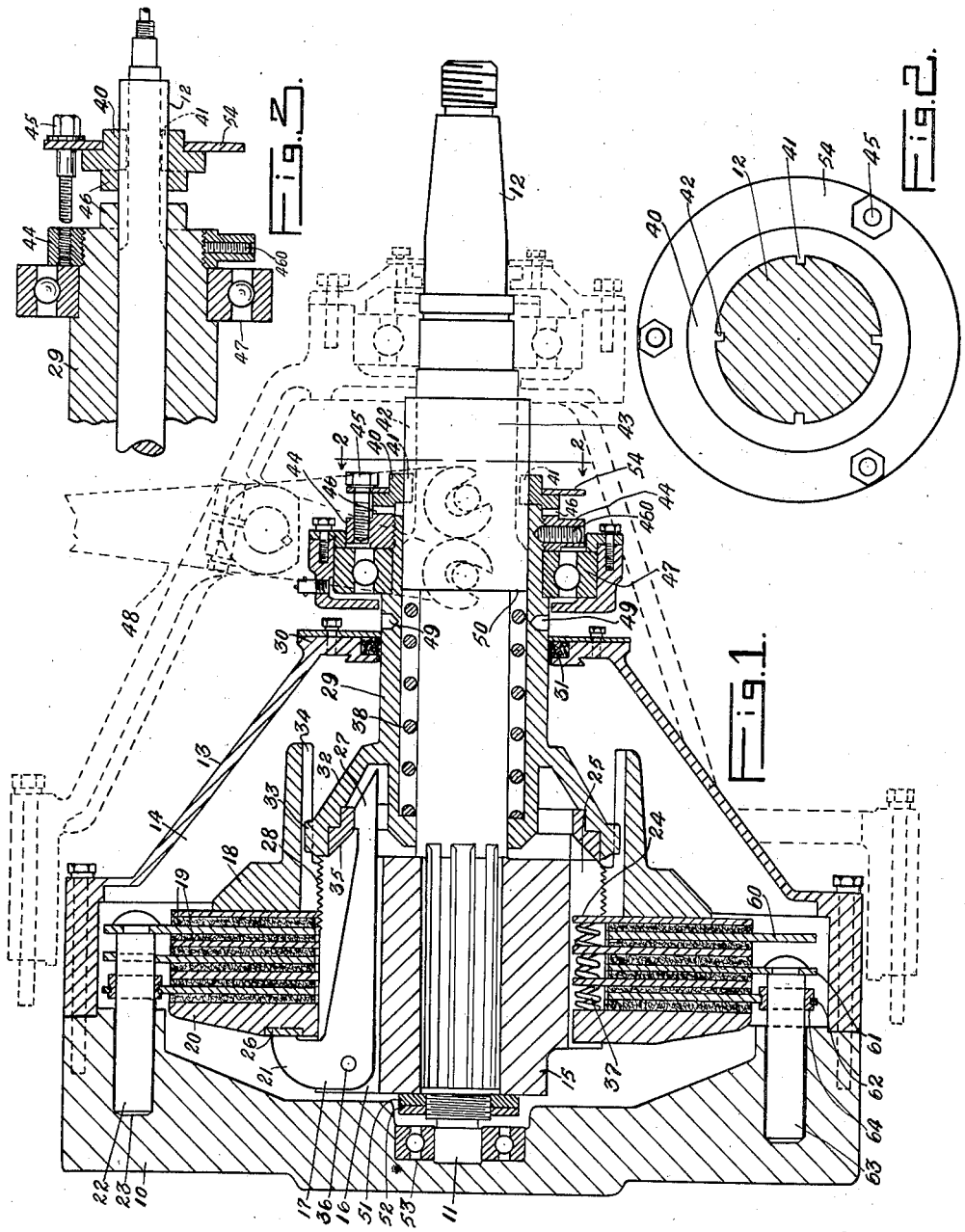

1,973,199

UNITED STATES PATENT OFFICE 1,973,199

CLUTCH

Alfred A. Conway, Cincinnati, Ohio

Application February 27, 1930, Serial No. 431,788

7 Claims. (Cl. 192—69)

This invention relates to clutches intended for mounting in an oil bath and particularly to means for adjusting the parts of the clutch without obliging the operator to open the casing of the oil bath or to expose the various clutch parts confined within the oil bath.

The invention is exemplified in conjunction with a clutch of the type disclosed in the patent to A. A. Conway, No. 1,745,079 of January 28, 1930, although it is to be understood that the invention is not restricted to clutches of that specific type.

An object of the invention is to provide a simple structure comprising a minimum of parts, for accomplishing the foregoing results.

Another object is to provide a device of the character indicated which is especially adapted to use in connection with automobile transmission or clutch systems.

These and other objects are attained by the means described herein and disclosed in the accompanying drawing in which:

Fig. 1 is a longitudinal sectional view showing a device embodying the invention.

Fig. 2 is a sectional view on line 2—2 of Fig. 1.

Fig. 3 shows a fragmentary modification.

The fly-wheel 10 may be supplied with power from any suitable source and serves as a support for the bearing 11 of the driven shaft 12. Upon the fly-wheel 10 is mounted a casing or housing 13 which cooperates with fly-wheel 10 in providing an enclosed chamber 14 in which the clutch elements are contained and which is adapted to retain an oil supply as is common practice in connection with various types of disc clutches used in automobiles. Rigidly secured to the driven shaft 12 is a suitable support or sleeve 15. The sleeve 15 corresponds to the so-called drive member 10 in Conway Patent 1,745,079, in that the said sleeve is provided with longitudinally extending slots 16 in which are received pivotally mounted pawls 17 that lie beneath an abutment ring or plate 18, driven friction discs 19, driving friction discs 60, 61, 62 and a ring 20 upon which the cam 21 formed on the pawl, contacts. Alternate friction rings are connected with the sleeve 15 and the fly-wheel 10, as is common practice in this type of clutch. Those friction discs 60, 61, 62, intended to move with the fly-wheel 10 are connected with the fly-wheel 10 by means of suitable pins 22 and 63 that may be slidably received in recesses or bores 23 provided in the fly-wheel. The ends of the pins 22 projecting from the bores 23 in the fly-wheel extend through suitable apertures in the alternate friction discs that are intended to move with the fly-wheel 10. The complementary friction rings 19 are provided with suitable lugs 24 that are received in suitable slots 25 in the sleeve 15 to assure rotation of such friction rings with the sleeve 15. It is to be understood that all of the friction rings have movement lengthwise of the sleeve 15. The abutment 18 and the clamping ring 20 are intended to clamp the friction rings between them and to thereby transmit motion between the fly-wheel and the driven shaft. The clamping ring 20 may be provided with suitable seats 26 upon which the pawls 17 contact. The free ends 27 of the pawls are adapted to be moved centerward of the clutch or toward the axis of the fly-wheel and the driven shaft 12 for effecting clamping action on the clutch discs. The abutment 18 has a threaded connection with the sleeve 15 and wear of the discs is taken up by rotating the abutment ring 18 along its threaded connection with the sleeve 15, thereby advancing abutment 18 toward the clamping ring 20. In the event the friction discs are to be renewed, the abutment 18 would be backed off of the sleeve 15 by means of the threaded connection. The threaded connection is shown at 28. In order that the pawls 17 may be actuated from without the chamber 14 and so that the abutment ring 18 may be adjusted without said chamber, there is provided a sleeve 29 that is slidably mounted upon the shaft 12 and which extends on both sides of the radial diaphragm 30 formed on the casing or housing 13. Suitable packing 31 is carried by the diaphragm to avoid leakage of oil from the chamber 14. The sleeve 29 is provided with a conical extension 32 having lugs 33 at its outer edge or rim and which lugs are received in ways 34 formed in the inner wall of the abutment ring 18. The relationship of the sleeve 29 and the abutment ring 18 is such that rotation of the sleeve 29 will rotate the abutment ring 18 along its threaded connection 28, the sleeve 29 being adapted to have independent longitudinal movement or reciprocating motion along the shaft 12. Upon the inner face of the extension 32 of the sleeve 29 is a ring 35 provided with a conical face adapted to cooperate with the free end of the pawl 17 for actuating the pawl about its pivotal mounting 36 on the sleeve 15. The inner or center face of the ring 35 is preferably parallel with the axis of the shaft 12 and serves as a means for cooperating with a complementary face provided on the free end of the pawl 27 for locking the clutch in the position shown in Fig. 1. Suitable springs 37 are provided for yieldingly urging the friction rings apart, consequently movement of the extension 32 to the right from the position shown in Fig. 1, has the effect of releasing the friction discs.

The sleeve 29 is adapted to receive within it a suitable spring 38, that yieldingly urges the sleeve 29 toward the left, and therefore yieldingly retains the clutch discs in operative or driving relationship.

Upon that portion of the sleeve 29 disposed exteriorly of the chamber 14, there are mounted suitable elements for effecting a splined relationship between the sleeve 29 and the driven shaft 12. The said means are adapted to permit the separation of the sleeve 29 and the driven shaft 12 so that the sleeve 29 may be rotated upon the shaft 12 for effecting adjustment, as previously explained. However, in normal operation, the said parts retain the sleeve 29, in splined relation to the shaft 12. The said means comprise a ring 40 provided with one or more lugs 41 that may be received in suitable ways 42 provided in the enlarged portion 43 of the shaft 12. The ways 42 extend longitudinally of the shaft 12. The ring 40 may be detachably bolted to the ring 44 by means of bolts 45 and complementary teeth or the like 46 may be provided on the rings 40 and 44 to assure unitary rotation of the rings 40 and 44 when the teeth are engaged. The ring 44 is secured to the reciprocating sleeve 29 by means of suitable set screws 460. The ring 44 is preferably mounted upon the sleeve 29 by a threaded connection therebetween and serves to secure a suitable ball bearing or ball race 47. The ball bearing or race 47 is intended for connection with a suitable actuating lever 48 in any suitable manner, for example, any one of the various devices commonly used for connecting clutch pedals on automobiles in common use today. The sleeve 29 is provided with suitable sockets 49 with which a spanner wrench may be employed for rotating the sleeve upon the shaft 12 at such times as the rings 40 and 44 may be detached from one another.

The shoulder 50 provided on the enlarged portion 43 of the shaft 12 serves as an abutment means for the spring 38. The various parts of the device may be assembled upon the shaft 12, suitable nuts 51 and 52 being provided for securing the assembly upon shaft 12, whereupon the assembled structure may be connected with the fly-wheel by merely introducing the bearing 11 into the ball bearing or race 53 and by introducing the pins 22 and 63 into the sockets or recesses of the fly-wheel.

In the event it should become necessary to take up any wear of the friction discs, the bolts 45 would be loosened and rings 40 and 44 separated so sleeve 29 could be rotatably adjusted by means of a spanner wrench. Upon completion of the adjustment, the bolts 45 would again be drawn into the ring 44 for locking the sleeve 29 against rotation relative to the shaft 12. In order to permit facile attachment of the various parts 40, 44, and 45, a ring 54 is provided, said ring being received by the member 40 and having in it suitable apertures through which the bolts 45 pass. This arrangement permits very fine and ready adjustments of parts without detachment of the bolts 45 from ring 44 while adjustment is being made since bolts 45 are withdrawn only to the extent of permitting disengagement of teeth 46 on rings 40 and 44 whereby sleeve 29 is rendered free of splined engagement with shaft 12.

Although the member 10 as disclosed herein, exemplifies a fly-wheel, it is to be understood that in some types of installations, a member corresponding to the member 10 may be employed, and that such member would not perform a fly-wheel function, but would merely be one member of a clutch assembly, for example, a drive member. Accordingly, the use of the term fly-wheel is not intended to restrict use of the invention to composite structures including fly-wheels, but is intended to be given the broader significance of a drive or driven member, forming parts of clutch assemblies. It is obvious that the invention disclosed herein, is readily adaptable to the machine tool industry, and other arts, wherein clutches are preferably operated in an oil bath. The fly-wheel may be termed a carrier member.

The longer pins 22 are preferably riveted or otherwise fixed to the friction disk 60, and extend through disks 61 and 62. The shorter pins 63 are likewise preferably fixed to the intermediate disk 61, and extend through apertures in the disk 62. The disk 62, in that it is not riveted to any pins, is provided with washers or abutment collars 64 through which the pins project.

In the modification shown in Fig. 3, the sleeve 29 is provided with teeth such as 46, for cooperating with similar teeth 46 on the ring 40. The modified structure functions in the same manner as does the structure shown in Fig. 1.

What is claimed is:

1. The combination of a fly-wheel, a shaft coaxial with and adapted for movement with the fly-wheel, a sleeve adapted for oscillation and reciprocation on the shaft, a casing carried by the fly-wheel and having a central aperture, the sleeve extending movably through the aperture in the casing, the fly-wheel, casing and sleeve together forming a chamber between them, complementary clutch elements within the chamber and connected with the fly-wheel and shaft and adapted to assume positions for connecting and disconnecting the fly-wheel and shaft, means within the chamber for taking up wear of the clutch members, a splined connection between the last mentioned means and the sleeve whereby oscillation of the sleeve modifies the cooperative relationship of the clutch elements, and means exteriorly of the chamber for reciprocating the sleeve for actuating the clutch elements for connecting and disconnecting the fly-wheel and the shaft.

2. The combination of a fly-wheel, a shaft coaxial with and adapted for movement with the fly-wheel, a sleeve adapted for oscillation and reciprocation on the shaft, a casing carried by the fly-wheel and having a central aperture, the sleeve extending movably through the aperture in the casing, the fly-wheel, casing and sleeve together forming a chamber between them, complementary clutch elements within the chamber and connected with the fly-wheel and shaft and adapted to assume positions for connecting and disconnecting the fly-wheel and shaft, means within the chamber for taking up wear of the clutch members, a connection between the last mentioned means and the sleeve whereby oscillation of the sleeve modifies the cooperative relationship of the clutch elements, means exteriorly of the chamber for reciprocating the sleeve for actuating the clutch elements for connecting and disconnecting the fly-wheel and the shaft, and disconnectable means independent of the chamber for so connecting the sleeve with the shaft that the sleeve may be reciprocated but not oscillated relative to the shaft, the sleeve being adapted for oscillation when said disconnectable means are disconnected.

3. A clutch assembly comprising a rotatable recessed carrier member having an axial bearing, a second rotatable member rotatably supported by the axial bearing, complementary clutch members carried by the rotatable members, including a pin carried by one of the clutch members, the pin being insertable into the recess in the carrier member whereby said one clutch member is moved with the carrier member and means independent of the clutch members and extending at substantially right angles therewith for actuating the said members to operative and inoperative positions whereby to operably connect and disconnect the carrier member and the second mentioned rotatable member, said actuating means being disposed centrally relative to the clutch member.

4. A clutch assembly comprising a rotatable recessed carrier member having an axial bearing, a second rotatable member rotatably supported by the axial bearing, complementary clutch members carried by the rotatable members, including a pin carried by one of the clutch members, the pin being insertable into the recess in the carrier member whereby said one clutch member is moved with the carrier member, means for actuating the clutch members to operative and inoperative positions whereby to connect and disconnect the carrier member and the second mentioned rotatable member, a casing carried by the carrier member and with said carrier member enclosing the clutch members, the clutch actuating means extending through the casing, means associated with the clutch members for adjusting the clutch members relative to one another, means within the casing operable by said clutch actuating means for actuating the adjusting means, and releasable means exteriorly of the casing adapted in its non release position to preclude clutch-adjusting operation of the clutch actuating means.

5. In a clutch assembly the combination of a rotatable recessed member, a second rotatable member coaxial with the first mentioned rotatable member, a slotted sleeve secured on the second member, friction discs carried by the rotatable members, pins each having an end received in a recess in the first member and having their other ends connected with certain of the friction discs at the peripheral edge thereof, connections between certain other of the friction discs and the sleeve at the centers thereof, the discs being all adapted for movement longitudinally of the sleeve, an abutment ring and a clamping ring receiving the friction discs between them, the abutment ring having an adjustable mounting on the sleeve whereby rotary movement of the abutment ring relative to the sleeve causes the abutment ring to move longitudinally of the sleeve, pawls disposed in the slots in the sleeve and having pivotal mountings on the sleeve, the pawls having a short and a long arm, the short arm extending radially from the sleeve and contacting the clamping ring, the long arm extending toward the abutment ring and terminating adjacent the abutment ring, a sleeve having a rotatable and reciprocable mounting on the second member and adapted to actuate the long arm of the pawls for clamping the friction rings between the clamping ring and abutment ring, the sleeve having a splined connection with the abutment ring whereby rotation of the sleeve will rotate the abutment ring and reciprocation of the sleeve will actuate the pawls, and disconnectable means comprising a member splined to the second mentioned rotatable member and connectable to the sleeve whereby connection of the sleeve to the second mentioned rotatable member precludes rotation of the sleeve independently of the second mentioned rotatable member.

6. In a clutch assembly the combination of a rotatable recessed member, a second rotatable member coaxial with the first mentioned rotatable member, a slotted sleeve secured on the second member, friction discs carried by the rotatable members, pins each having an end received in a recess in the first member and having their other ends connected with certain of the friction discs at the peripheries thereof, connections between certain other of the friction discs and the sleeve at the centers thereof, the discs being all adapted for movement longitudinally of the sleeve, an abutment ring and a clamping ring receiving the friction discs between them, the abutment ring having an adjustable mounting on the sleeve whereby rotary movement of the abutment ring relative to the sleeve causes the abutment ring to move longitudinally of the sleeve, pawls disposed in the slots in the sleeve and having pivotal mountings on the sleeve, the pawls having a short and a long arm, the short arm extending radially from the sleeve and contacting the clamping ring, the long arm extending toward the abutment ring and terminating adjacent the abutment ring, a sleeve having a rotatable and reciprocable mounting on the second member and adapted to actuate the long arm of the pawls for clamping the friction rings between the clamping ring and abutment ring, the sleeve having a splined connection with the abutment ring whereby rotation of the sleeve will rotate the abutment ring and reciprocation of the sleeve will actuate the pawls, disconnectable means comprising a member splined to the second mentioned rotatable member and connectible to the sleeve whereby connection of the sleeve to the second mentioned rotatable member precludes rotation of the sleeve independently of the second mentioned rotatable member, and a casing carried by the first mentioned rotatable member and having an axial opening, the sleeve extending rotatably and reciprocally through the opening in the casing whereby the first mentioned rotatable member, casing and sleeve provide a closed chamber containing the clutch members, the disconnectable means being disposed exteriorly of said chamber whereby to permit operation and adjustment of the clutch parts from without the chamber.

7. In a clutch, a carrier having a bearing, and recesses spaced about said bearing, a shaft having a mounting in said bearing, two sets of cooperating friction rings disposed on said shaft and carrier respectively, pins connected with one of the sets of friction rings and each having an end inserted in a recess in the carrier, the second of the sets of friction rings being connected to move with the shaft, and means independent of the friction rings and extending at substantially right angles thereto for releasably clamping the sets of friction rings upon one another for effecting movement of the shaft with the carrier, said clamping means being disposed centrally relative to the friction rings.

ALFRED A. CONWAY.